United States Patent
Tirkkonen et al.

(10) Patent No.: US 9,294,180 B2
(45) Date of Patent: Mar. 22, 2016

(54) PILOT DESIGN FOR LONG TERM EVOLUTION UPLINK MULTI-INPUT MULTI-OUTPUT ANTENNA SYSTEM

(75) Inventors: Olav Tirkkonen, Helsinki (FI); Kari Pajukoski, Oulu (FI); Jianfeng Kang, Beijing (CN)

(73) Assignee: Nokia Technologies Oy, Espoo (FI)

( * ) Notice: Subject to any disclaimer, the term of this patent is extended or adjusted under 35 U.S.C. 154(b) by 895 days.

(21) Appl. No.: 11/895,616

(22) Filed: Aug. 23, 2007

(65) Prior Publication Data

US 2008/0049791 A1   Feb. 28, 2008

Related U.S. Application Data

(60) Provisional application No. 60/839,837, filed on Aug. 23, 2006.

(51) Int. Cl.
| | | |
|---|---|---|
| H04B 3/10 | (2006.01) | |
| H04B 7/06 | (2006.01) | |
| H04L 5/00 | (2006.01) | |
| H04L 25/02 | (2006.01) | |
| H04J 1/16 | (2006.01) | |
| H04J 3/14 | (2006.01) | |

(52) U.S. Cl.
CPC .............. *H04B 7/0634* (2013.01); *H04L 5/005* (2013.01); *H04L 5/0051* (2013.01); *H04L 25/0226* (2013.01)

(58) Field of Classification Search
None
See application file for complete search history.

(56) References Cited

U.S. PATENT DOCUMENTS

| | | | |
|---|---|---|---|
| 2002/0177468 A1* | 11/2002 | Takeuchi et al. | 455/562 |
| 2003/0124994 A1* | 7/2003 | Ylitalo | 455/91 |
| 2006/0120272 A1* | 6/2006 | Wang et al. | 370/208 |
| 2007/0004465 A1* | 1/2007 | Papasakellariou et al. | 455/571 |
| 2007/0009016 A1* | 1/2007 | Tsutsui | 375/219 |
| 2007/0070944 A1* | 3/2007 | Rinne et al. | 370/329 |
| 2007/0248147 A1* | 10/2007 | Tiirola et al. | 375/135 |
| 2008/0095223 A1* | 4/2008 | Tong et al. | 375/228 |
| 2008/0276148 A1* | 11/2008 | Lohr et al. | 714/750 |
| 2008/0318606 A1* | 12/2008 | Tsutsui et al. | 455/500 |
| 2009/0052470 A1* | 2/2009 | Yun et al. | 370/491 |

OTHER PUBLICATIONS

3rd Generation Partnership Project ("3GPP"), 3GPP TR 25.814, Jun. 2005, vol. 0.1.1.*
3GPP TR 25.814 V1.0.3 (Feb. 2006), 3rd Generation Partnership Project; Technical Specification Group Radio Access Network; Physical Layer Aspects for Evolved UTRA (Release 7) (76 pages).*
3GPP TSG-RAN Working Group 1 Meeting #45; R1-061235; "Uplink Adaptive Transmission with TP", May 8-12, 2006, retrieved from the Internet: http://www.3gpp.org/ftp/tsg_ran/WG1_RL1/TSGR1_45/Docs/, the whole document.

(Continued)

*Primary Examiner* — Ayaz Sheikh
*Assistant Examiner* — Sori Aga
(74) *Attorney, Agent, or Firm* — Harrington & Smith

(57) ABSTRACT

A pilot transmission in a multiple antenna closed loop transmission time multiplexes a beam-specific pilot and an antenna-specific pilot in two short blocks of one uplink subframe. The beam-specific pilot is transmitted as an in-band pilot with the same beam as data to provide optimal data demodulation/estimation. The antenna-specific pilot is transmitted as an out-band pilot to provide optimal beam selection.

11 Claims, 4 Drawing Sheets

(56) References Cited

OTHER PUBLICATIONS

3GPP TSG-RAN Working Group 1 Meeting #44bis; R1-060907; "Sounding channel for UL channel-dependent scheduling", Athens, Greece, Mar. 27-31, 2006, retrieved from the Internet: http://www.3gpp.org/ftp/tsg_ran/WG1_RL1/TSGR1_44bis/Docs/, the whole document.

3GPP TSG RAN WG1 #44 Meeting; R1-060294; "UL Reference Signal Structure", Denver; USA, Feb. 13-17, 2006 retrieved from the Internet: http://www.3gpp.org/ftp/tsg_ran/WG1_RL1/TSGR1_44/Docs/, the whole document.

3GPP TSG RAN WG1 #46 Meeting; R1-62354; "UL MIMO Reference Signal Structure", Tallinn, Estonia Aug. 28,-Sep. 1, 2006, retrieved from the Internet: http://www.3gpp.org/ftp/tsg_ran/WG1_RL1/TSGR1_46/Docs/, the whole document.

3GPP TR 25.814 V7.0.0 (Jun. 2006), $3^{rd}$ Generation Partnership Project; Technical Specification Group Radio Access Network; Physical layer aspects for evolved Universal Terrestrial Radio Access (UTRA) (Release 7).

TSG-RAN WG1 #44; R1-060363; Presentation of Specification to TSG RAN WG1 #44; Denver, U.S.A, Feb. 13-17, 2006.

A. Bastug, et al.; "Common and Dedicated Pilot-Based Channel Estimates Combining and Kalman Filtering for WCDMA Terminals," ASILOMAR Conference on, Pacific Grove, California Oct. 28,-Nov. 1, IEEE, Oct. 28, 2005, pp. 111-115.

* cited by examiner

PILOT DESIGN FOR LONG TERM EVOLUTION UPLINK MULTI-INPUT MULTI-OUTPUT ANTENNA SYSTEM

CROSS-REFERENCE TO RELATED APPLICATION

This application claims priority from U.S. Provisional Patent Application No. 60/839,837 filed on Aug. 23, 2006.

FIELD OF THE INVENTION

The invention relates generally to closed loop transmission from multiple antennas and deals more particularly with the uplink in Long Term Evolution (LTE) Multi-Input and Multi-Output (MIMO) antenna systems and specifically with the pilot design for such a system.

LIST OF ABBREVIATIONS

BF: Beamforming
BS: Base station
CPICH: Common Pilot Channel
CSI: Channel state information
CQI: Channel Quality Indicator
FB: Frequency correction Burst
HS-DSCH: High Speed Downlink Channel
LTE: Long term evolution
MIMO: Multi-Input and Multi-Output
SB: Short Block
SC: Single carrier
SINR: Signal to Interference Plus Noise
TrCH: Transport Channel
UE: User Equipment
UL: Uplink
WCDMA: Wideband Code Division Multiple Access

BACKGROUND OF THE INVENTION

The pilot design in uplink (UL) multiple antenna systems presents a very difficult problem and the pilot design must accommodate a number of different considerations. From the perspective of demodulation performance, it is best to concentrate the pilot power exactly to the frequency and time resources used for data. This is referred to as in-band pilot. From the perspective of being able to schedule users onto different frequencies, it is beneficial to transmit a wider band pilot. This is referred to as out-band pilot.

For a closed loop transmission from multiple antennas, the pilot design must solve the same problem as for channel dependent scheduling. That is to design a pilot transmission, which provides robust data demodulation, while simultaneously providing the possibility to calculate Channel Quality Indicator/Frequency correction Burst (CQI/FB) that is needed to align the transmissions from the multiple antennas at the receiver.

The Long Term Evolution (LTE) Technical report (3GPP TR25.814 v1.0.3, Rel7), suggests and only states that the pilots in uplink (UL) may be multiplexed in frequency division multiplex (FDM) or time division multiplex (TDM) or code division multiplex (CDM) or the combination of them, and that the pilot signals are transmitted within two short blocks. The multiplexing mentioned in the prior art means multiplexing between different pilot signals for example, from multiple user equipments (UE's). The multiplexing methods mentioned in the LTE technical report do not refer to or suggest multiplexing between antenna-specific and beam-specific pilots. Although in-band and out-of band solutions are known as well as antenna-specific pilots and beam-specific pilots, it is not known to combine the two. According to the inventors' knowledge and understanding, the multiplexing method between antenna-specific and beam-specific pilots does not exist in the LTE system. In LTE, the term "antenna-specific" pilot is also known as "common" pilot and the term "beam-specific" pilot is also known as "dedicated" pilot.

It is desirable to provide a pilot design transmission in uplink (UL) in multiple antenna systems by combining the antenna-specific and beam-specific pilots.

SUMMARY OF THE INVENTION

In accordance with a broad aspect of the invention, a pilot transmission in a multiple antenna closed loop transmission time multiplexes a beam-specific pilot and an antenna-specific pilot in two short blocks of one uplink sub-frame. The beam-specific pilot is transmitted as an in-band pilot with the same beam as data to provide optimal data demodulation/estimation. The antenna-specific pilot is transmitted as an out-band pilot to provide optimal beam selection.

WRITTEN DESCRIPTION OF EXEMPLARY EMBODIMENTS OF THE INVENTION

Figure 1:
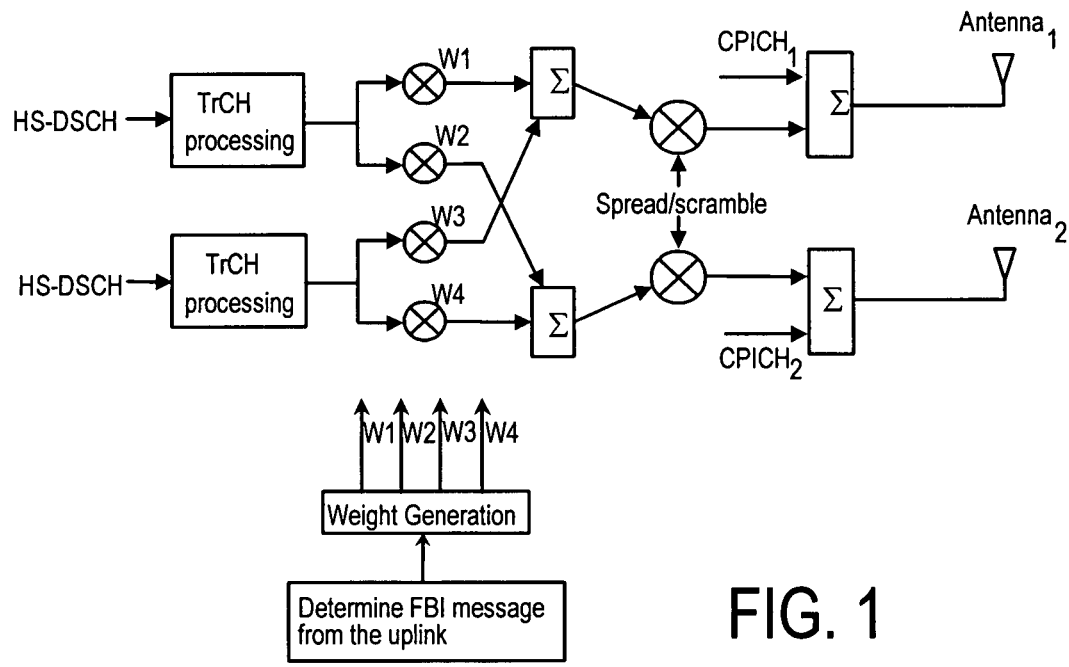
FIG. 1 is a block diagram of a MIMO system.

Generally, in MIMO systems multiple transmitter data streams are used to increase data throughput. As shown by FIG. 1 each separate data stream is transmitted by each transmit antenna in the MIMO system, but different weights are assigned to the respective data streams for each antenna creating virtual antennas. At the receiving end, each receiving antenna receives the composite data signal from all transmitting antennas. MIMO schemes can be divided into information MIMO and diversity MIMO.

In Diversity MIMO basically the same information is transmitted in both antennas. Beamforming is the special case from diversity MIMO. In beamforming, the same information is transmitted in both antennas but the antenna signals are weighted (in the complex domain) in such a way that signal strength in a desired direction will be maximized.

To be very specific, both antennas transmit the same information content for the data transmission. Also, both antennas transmit the same pilot content for the beam-specific pilot transmission. For the antenna-specific pilot transmission, however, the antennas transmit differently, that is (TDM, CDM or FDM) orthogonalized pilot signals.

In this example of the invention, the problem setting is specified as closed-loop MIMO for UL. Closed loop means that the transmitting UE has acquired information from the base station that it is beneficial to transmit the same data from multiple antennas, so that the antenna signals are weighted as explained above. The purpose of the weighting is to maximize the SINR on the beam that is constructed when the same data is simultaneously transmitted from multiple antennas. Due to Frequency Division Duplexing, the weight needs to be measured at the other end of the link and fed back over a feedback channel. For that reason, the weights need to be quantized. The best known feedback-based closed loop transmit diversity systems are Mode 1 and Mode 2 that were standardized for WCDMA Downlink and are well known and understood in the art.

In another example of the invention, a similar closed-loop transmit diversity for UL is considered. The same situation exists, that is, the other end (now the base station (eNodeB)), needs to evaluate the best weights, and then feed back information related to these weightings. This process (evaluating the best weights) is not possible, if eNodeB is not capable of separately estimating the channel from the multiple antennas. "Antenna-specific pilots" are needed for separately estimating the channel. This means that pre-agreed signals are transmitted from both antennas in an almost orthogonal manner. For example, different pilot codes may be used for the transmissions from the multiple antennas. The alternatives listed above are time, frequency and code multiplexed antenna-specific pilot signals. For channel estimation for demodulation, a pilot signal that is transmitted on exactly the same beam as the data (i.e. using the same weights as the data) is beneficial. This is the "beam-specific" pilot discussed above.

The invention proposes to time multiplex dedicated in-band pilots (using the same beam transmission in case of beamforming at the terminal) and antenna-specific out-of-band pilots allowing CQI estimation for scheduling decisions and beam selection.

The pilot transmission scheme of the invention in which two kinds of pilots are defined is designed for LTE uplink MIMO. One defined pilot is an antenna-specific pilot, in which orthogonal pilots will be transmitted from multiple antennas respectively in TDM, CDM or FDM fashion. For example, with TDM fashion, the antenna-specific pilots are transmitted from different antennas in different sub-frames. The antenna-specific pilot is mainly used for beam selection. Another defined pilot is a beam-specific pilot, in which only one pilot is transmitted by using the same beam as data transmission.

Figure 2:
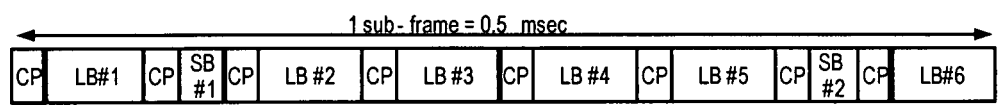
FIG. 2 shows a sub-frame format with two short blocks, for SC uplink.

Both the antenna-specific pilot and beam-specific pilot are transmitted in one UL sub-frame, by a suitable multiplexing method. In 3GPP LTE UL, there are two short blocks (SB#1 and SB#2) in a 0.5 ms sub-frame as shown in FIG. 2, in which short blocks the pilots are transmitted. In the example shown in FIG. 2, for multiple antenna transmissions, an in-band pilot is transmitted in one short block (SB#1), and an out-band pilot is transmitted in another short block (SB#2).

Accordingly, the beam-specific pilots, providing the best data demodulation performance, are transmitted as in-band pilots. Thus the impulse response from the channel as a whole, i.e. $(h_1+wh_2)$, can be estimated and used in the data demodulation/estimation. In this sense, the in-band beam-specific pilot is optimal for demodulation.

The antenna-specific pilots, which are needed for FB calculation, are transmitted as out-band pilots (in case that the UE is assumed to transmit out-band pilots). In this way the SB with antenna-specific and possibly out-band pilots can be used to calculate both the best antenna weights and the CQI for possible transmission on different parts of the operation bandwidth.

One advantage of the invention is that both the antenna-specific pilot and the beam-specific pilot are transmitted in an UL sub-frame. The antenna-specific and beam-specific pilots are time division multiplexed into two short blocks in one sub-frame so that in one SB, the sub-frame has antenna-specific pilots, and in the other SB, the sub-frame has beam-specific pilots. Also, the in-band and out-band pilot transmissions for frequency domain scheduling are combined with the antenna-specific and beam-specific pilots.

The pilot design embodying the present invention optimally satisfies the needs for data demodulation and FB calculation by using the beam-specific pilot and antenna-specific pilot.

The time division multiplexed transmission of the antenna-specific pilot and beam-specific pilot for the pilot design embodying the present invention is well suited for use with the sub-frame structure specified in LTE.

Figure 3:
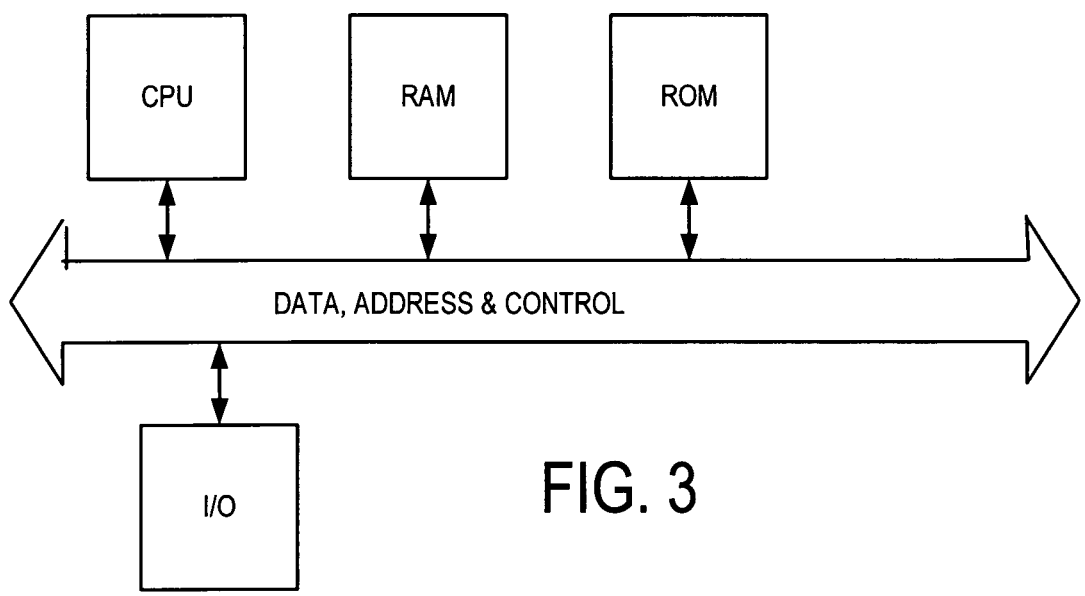
FIG. 3 is a functional block diagram of an example of a signal processor for carrying out the invention.

The interactions between the major logical functions should be obvious to those skilled in the art for the level of detail needed to gain an understanding of the concept of the present invention. It should be noted that the concept of the invention may be implemented with an appropriate signal processor such as shown in FIG. 3, a digital signal processor or other suitable processor to carry out the intended function of the invention, Turning now to FIG. 4, a schematic functional block diagram of a UE or mobile terminal is illustrated therein showing the major operational functional components which may be required to carry out the intended functions of the mobile terminal and implement the concept of the invention. A processor such as the signal processor of FIG. 3 carries out the computational and operational control of the mobile terminal in accordance with one or more sets of instructions stored in a memory. A user interface may be used to provide alphanumeric input and control signals by a user and is configured in accordance with the intended function to be carried out. A display sends and receives signals from the controller that controls the graphic and text representations shown on a screen of the display in accordance with the function being carried out.

The controller controls a transmit/receive unit that operates in a manner well known to those skilled in the art. The functional logical elements for carrying out the multiplexing and weighting operational functions are suitably interconnected with the controller to carry out the provision of the pilot transmission in a multiple antenna closed loop transmission by multiplexing the in-band and out-band pilots as contemplated in accordance with the invention. An electrical power source such as a battery is suitably interconnected within the mobile terminal to carry out the functions described above. It will be recognized by those skilled in the art that the mobile terminal may be implemented in other ways other than that shown and described.

The invention involves or is related to cooperation between elements of a communication system. Examples of a wireless communication system include implementations of GSM (Global System for Mobile Communication) and implementations of UMTS (Universal Mobile Telecommunication System). These elements of the communication systems are exemplary only and does not bind, limit or restrict the invention in any way to only these elements of the communication systems since the invention is likely to be used for B3G systems. Each such wireless communication system includes a radio access network (RAN). In UMTS, the RAN is called UTRAN (UMTS Terretrial RAN). A UTRAN includes one or more Radio Network Controllers (RNCs), each having control of one or more Node Bs, which are wireless terminals configured to communicatively couple to one or more UE terminals. The combination of an RNC and the Node Bs it controls is called a Radio Network System (RNS). A GSM RAN includes one or more base station controllers (BSCs), each controlling one or more base transceiver stations (BTSs). The combination of a BSC and the BTSs it controls is called a base station system (BSS).

Figure 5:
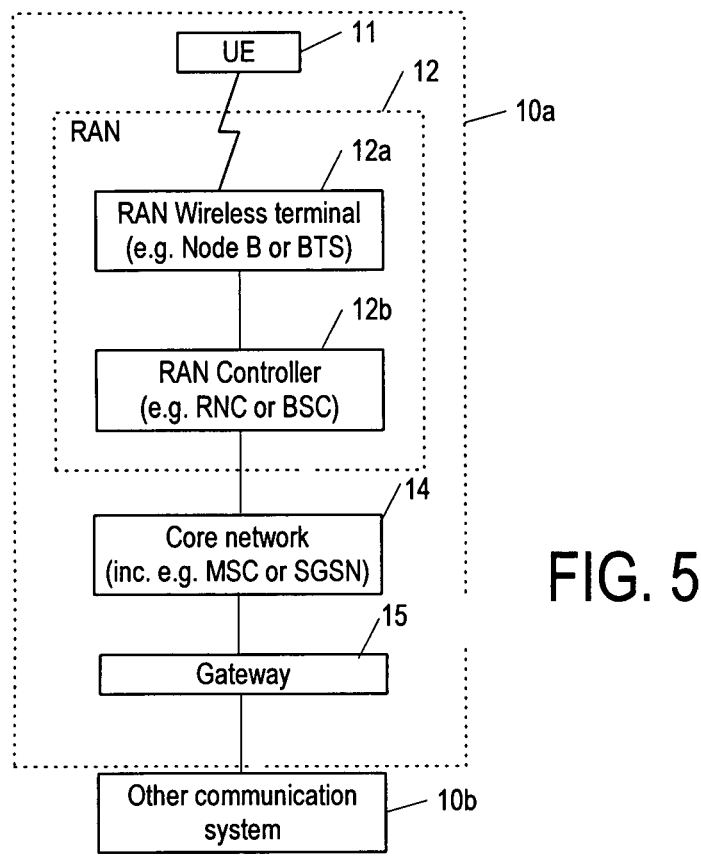
FIG. 5 is a block diagram/flow diagram of a wireless communication system in which the present invention may be implemented, including various communication terminals, and in particular a user equipment (UE) terminal and a wireless terminal of a radio access network (RAN).

Referring now to FIG. 5, a wireless communication system 10*a* in which the present invention may be implemented is shown, including a UE terminal 11, a radio access network 12, a core network 14 and a gateway 15, coupled via the gateway to another communications system 10*b*, such as the Internet, wireline communication systems (including the so-called plain old telephone system), and/or other wireless communication systems. The radio access network includes a wireless terminal 12*a* (e.g. a Node B or a BTS) and a controller 12*b* (e.g. a RNC or a BSC). The controller is in wireline communication with the core network. The core network typically includes a mobile switching center (MSC) for circuit-switched communication, and a serving general packet radio service (GPRS) support node (SGSN) for packet-switched communication.

Figure 6:
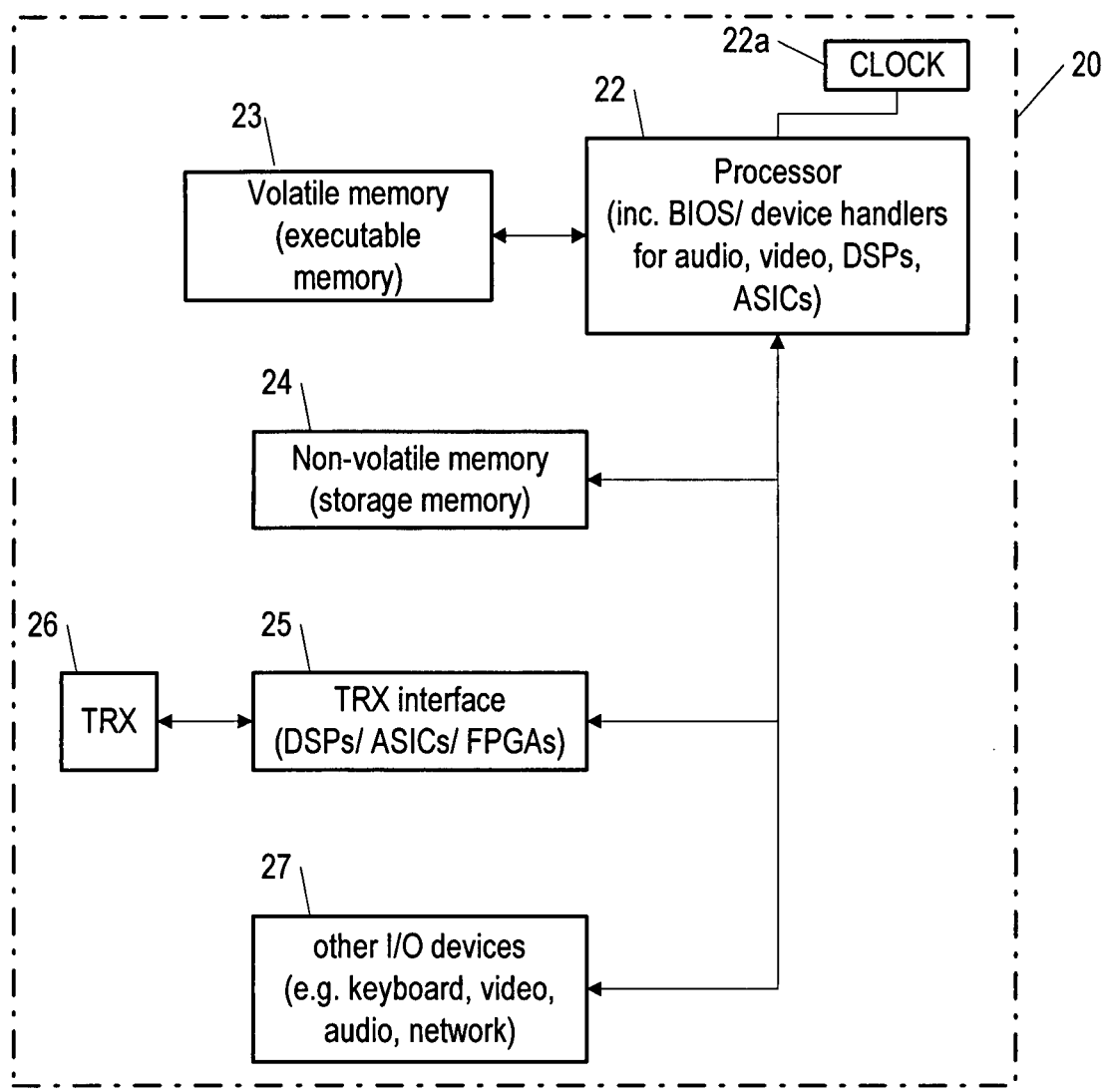
FIG. 6 is a reduced block diagram (only portions relevant to the invention being shown) of the UE terminal or the wireless terminal of the RAN of FIG. 5.

FIG. 6 shows some components of a communication terminal 20, which could be either the UE terminal 11 or the RAN wireless terminal 12*a* of FIG. 5. The communication terminal includes a processor 22 for controlling operation of the device, including all input and output. The processor, whose speed/timing is regulated by a clock 22*a*, may include a BIOS (basic input/output system) or may include device handlers for controlling user audio and video input and output as well as user input from a keyboard. The BIOS/device handlers may also allow for input from and output to a network interface card. The BIOS and/or device handlers also provide for control of input and output to a transceiver (TRX) 26 via a TRX interface 25 including possibly one or more digital signal processors (DSPs), application specific integrated circuits (ASICs), and/or field programmable gate arrays (FPGAs). The TRX enables communication over the air with another similarly equipped communication terminal.

Figure 4:
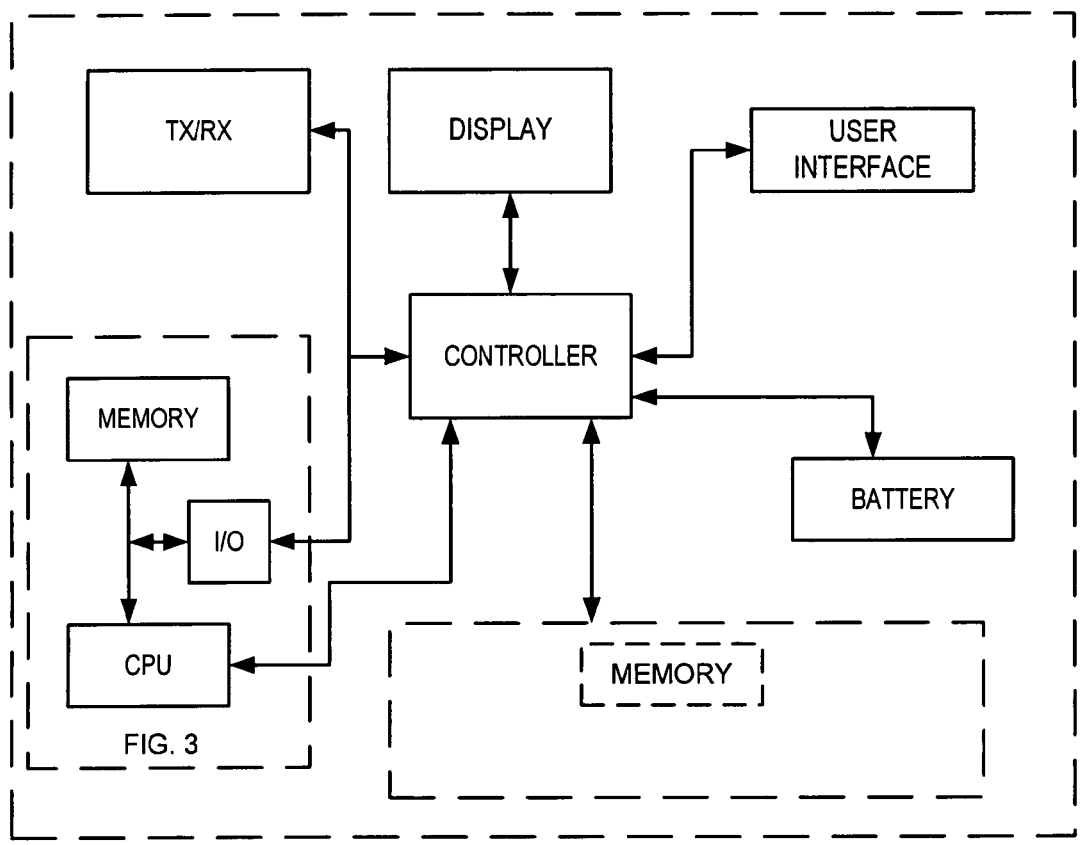
FIG. 4 is a functional block diagram of an example of a UE or mobile terminal for carrying out the invention.

Still referring to FIG. 4 the communication terminal includes volatile memory, i.e. so-called executable memory 23, and also non-volatile memory 24, i.e. storage memory. The processor 22 may copy applications (e.g. a calendar application or a game) stored in the non-volatile memory into the executable memory for execution. The processor functions according to an operating system, and to do so, the processor may load at least a portion of the operating system from the storage memory to the executable memory in order to activate a corresponding portion of the operating system. Other parts of the operating system, and in particular often at least a portion of the BIOS, may exist in the communication terminal as firmware, and are then not copied into executable memory in order to be executed. The booting up instructions are such a portion of the operating system.

Figure 7:
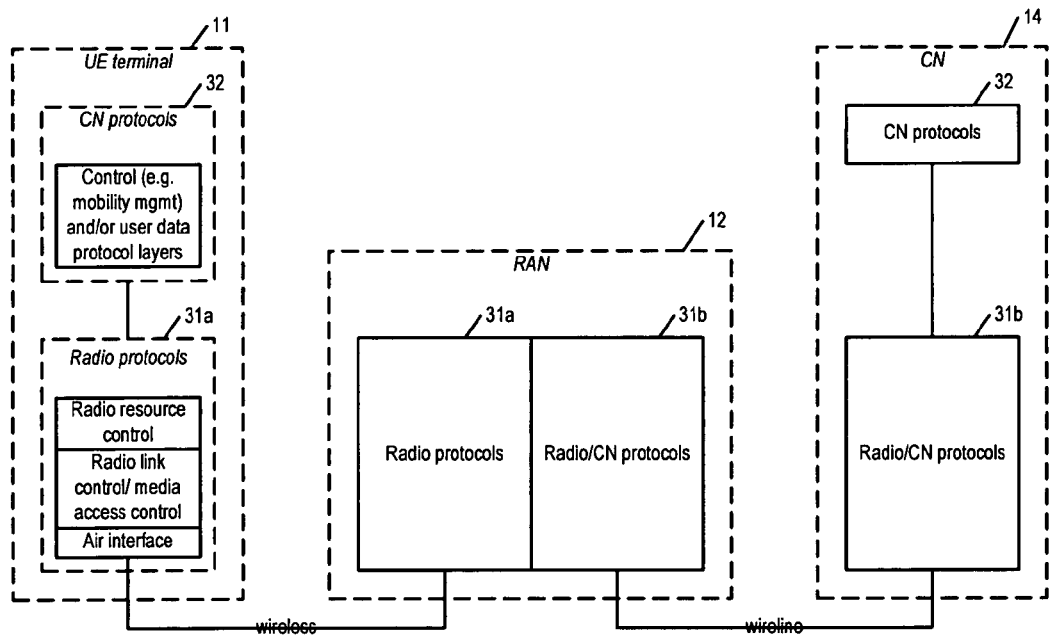
FIG. 7 is a reduced block diagram of two communications terminals of FIG. 5 in terms of a multi-layered communication protocol stack.

Referring now to FIG. 7, the wireless communication system of FIG. 5 is shown from the perspective of layers of a protocol according to which communication is performed. The layers of protocol form a protocol stack, and include CN protocol layers 32 located in the UE 11 and CN 14, and radio protocol layers 31*a* located in the UE terminal and in the RAN 12 (in either the RAN wireless terminal 12*a* or the RAN controller 12*b*). Communication is peer-to-peer. Thus, a CN protocol layer in the UE communicates with a corresponding layer in the CN, and vice versa, and the communication is provided via lower/intervening layers. The lower/intervening layers thus provide as a service to the layer immediately above them in the protocol stack the packaging or unpackaging of a unit of communication (a control signal or user data).

The CN protocols typically include one or more control protocol layers and/or user data protocol layers (e.g. an application layer, i.e. the layer of the protocol stack that interfaces directly with applications, such as a calendar application or a game application).

The radio protocols typically include a radio resource control (protocol) layer, which has as its responsibilities, among quite a few others, the establishment, reconfiguration, and release of radio bearers. Another radio protocol layer is a radio link control/media access control layer (which may exist as two separate layers). This layer in effect provides an interface with the physical layer, another of the radio access protocol layers, and the layer that enables actual communication over the air interface.

The radio protocols are located in the UE terminal and in the RAN, but not the CN. Communication with the CN protocols in the CN is made possible by another protocol stack in the RAN, indicated as the radio/CN protocols stack. Communication between a layer in the radio/CN protocols stack and the radio protocols stack in the RAN may occur directly, rather than via intervening lower layers. There is, as shown in FIG. 9, a corresponding radio/CN protocols stack located in the CN, allowing then communication between the application level in the UE terminal and the application level in the CN.

Figure 8:
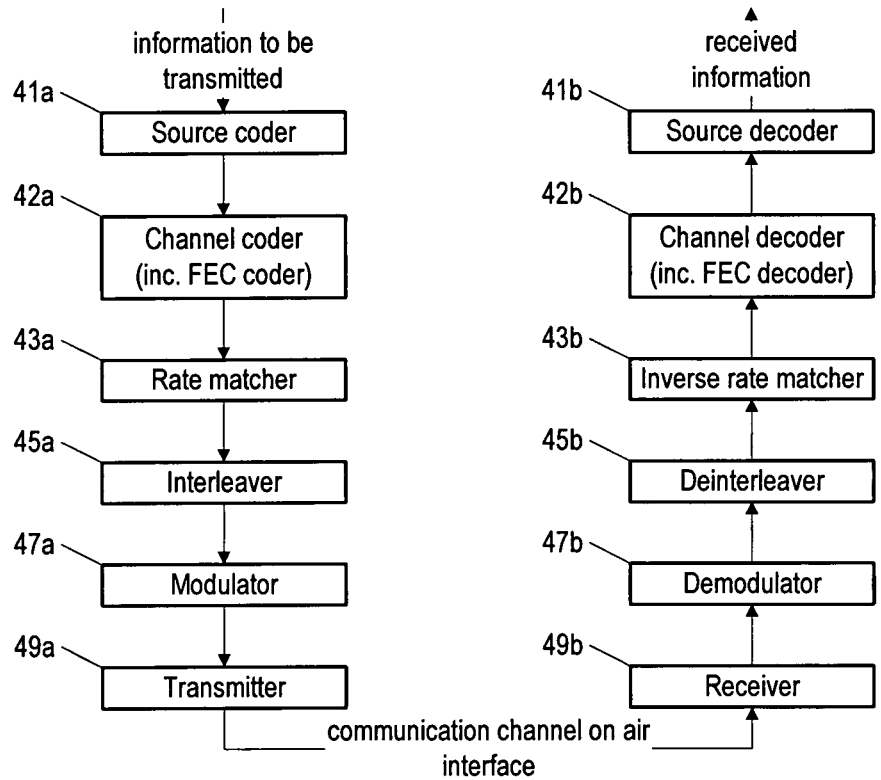
FIG. 8 is a reduced block diagram of the user equipment terminal and the wireless terminal of the radio access network in terms of functional blocks corresponding to hardware equipment used in sending and receiving communication signals over an air interface communication channel linking the two communications terminals.

FIG. 8 is a reduced block diagram of the UE communication terminal 11 and the RAN wireless communication terminal 12*a* of FIG. 5, in terms of functional blocks corresponding to typically hardware (but in some cases software) equipment used in sending and receiving communication signals over a communication channel linking the two communications terminals 11 12*a*. Both typically include a source coder 41*a* responsive to information to be transmitted, and a corresponding source decoder 41*b*. The source coder removes redundancy in the information not needed to communicate the information. Both also include a channel coder 42*a* and a corresponding channel decoder 42*b*. The channel coder typically adds redundancy that can be used to correct error, i.e. it performs forward error correction (FEC) coding. Both communication terminals also include a rate matcher 43*a* and corresponding inverse rate matcher 43*b*. The rate matcher adds or removes (by so-called puncturing) bits from the bit stream provided by the channel coder, in order to provide a bit stream at a rate compatible with the physical channel being used by the communication terminals. Both communication terminals also include an interleaver 45*a* and a deinterleaver 45*b*. The interleaver reorders bits (or blocks of bits) so that strings of bits representing related information are not contiguous in the output bit stream, thus making the communication more resistant to so-called bursty errors, i.e. to errors from temporary causes and so that affect the communication for only a limited time, and so affect only a portion of the communicated bit stream. Both communication terminals also include a modulator 47*a* and a demodulator 47*b*. The modulator 47*a* maps blocks of the bits provided by the interleaver to symbols according to a modulation scheme/mapping (per a symbol constellation). The modulation symbols thus determined are then used by a transmitter 49a included in both communication terminals, to modulate one or more carriers (depending on the air interface, e.g. WCDMA, TDMA, FDMA, OFDM, OFDMA, CDMA2000, etc.) for transmission over the air. Both communication terminals also include a receiver 49b that senses and so receives the communication terminal and determines a corresponding stream of modulation symbols, which it passes to the demodulator 47b, which in turn determines a corresponding bit stream (possibly using FEC coding to resolve errors), and so on, ultimately resulting in a providing of received information (which of course may or may not be exactly the transmitted information). Usually, the channel decoder includes as components processes that provide so-called HARQ (hybrid automatic repeat request) processing, so that in case of an error not able to be resolved on the basis of the FEC coding by the channel coder, a request is sent to the transmitter (possibly to the channel coder component) to resend the transmission having the unresolvable error.

The functionality described above (for both the radio access network and the UE) can be implemented as software modules stored in a non-volatile memory, and executed as needed by a processor, after copying all or part of the software into executable RAM (random access memory). Alternatively, the logic provided by such software can also be provided by an ASIC (application specific integrated circuit). In case of a software implementation, the invention provided as a computer program product including a computer readable storage structure embodying computer program code—i.e. the software—thereon for execution by a computer processor.

It is to be understood that the above-described arrangements are only illustrative of the application of the principles of the present invention. Numerous modifications and alternative arrangements may be devised by those skilled in the art without departing from the scope of the present invention.

The invention claimed is:

1. A method, comprising:
   multiplexing an in-band pilot and an out-band pilot for providing a pilot transmission in response thereto in a multiple antenna closed loop transmission, and
   transmitting the in-band pilot and the out-band pilot in an uplink sub-frame,
   wherein said in-band pilot is a beam-specific pilot and said out-band pilot is an antenna-specific pilot, and wherein for beam-specific pilots, pilots are transmitted using the same beam as data transmission, and for antenna-specific pilots, orthogonal pilots are transmitted from multiple antennas.

2. The method as defined in claim 1 further comprising time division multiplexing the in-band pilot in a first short block in the uplink sub-frame and the out-band pilot in a second short block in the uplink sub-frame.

3. The method as defined in claim 1 further comprising combining the in-band pilot and out-band pilot transmissions for frequency domain scheduling with the beam-specific pilot and the antenna-specific pilot.

4. The method as defined in claim 1 wherein the pilot transmission further comprises a long term evolution uplink multi-input multi-output antenna system pilot transmission.

5. A method, comprising:
   time multiplexing a beam-specific pilot and an antenna-specific pilot for providing a pilot transmission in a multiple antenna closed loop transmission;
   transmitting the beam-specific pilot in a first short block in a sub-frame, and transmitting the antenna-specific pilot in a second short block in said sub-frame;
   wherein said beam-specific pilot is an in-band pilot and said antenna-specific pilot is an out-band pilot, wherein for beam-specific pilots, pilots are transmitted using the same beam as data transmission, and for antenna-specific pilots, orthogonal pilots are transmitted from multiple antennas.

6. An apparatus, comprising:
   at least one processor;
   memory storing a program of instructions;
   wherein the memory storing the program of instructions is configured to, with the at least one processor, cause the apparatus to at least:
   multiplex an in-band pilot and an out-band pilot into a pilot transmission signal for transmission in a multiple antenna closed loop transmission, and
   configure said pilot transmission signal for transmission in an uplink sub-frame,
   wherein said in-band pilot is a beam-specific pilot and said out-band pilot is an antenna-specific pilot, and wherein for beam-specific pilots, pilots are transmitted using the same beam as data transmission, and for antenna-specific pilots, orthogonal pilots are transmitted from multiple antennas.

7. The apparatus as defined in claim 6 further configured for time division multiplexing said in-band pilot in a first short block in said uplink sub-frame and said out-band pilot in a second short block of said uplink sub-frame.

8. A mobile station, comprising:
   at least one processor;
   memory storing a program of instructions;
   wherein the memory storing the program of instructions is configured to, with the at least one processor, cause the apparatus to at least:
   multiplex an in-band pilot and an out-band pilot into a pilot transmission signal for transmission in a multiple antenna closed loop transmission;
   configure said pilot transmission signal for transmission in an uplink sub-frame; and
   a transceiver, for transmitting said pilot transmission;
   wherein said in-band pilot is a beam-specific pilot and said out-band pilot is an antenna-specific pilot, and wherein for beam-specific pilots, pilots are transmitted using the same beam as data transmission, and for antenna-specific pilots, orthogonal pilots are transmitted from multiple antennas.

9. An application specific integrated circuit configured for operation according to claim 1.

10. An apparatus, comprising:
    a multiplexing means, configured for time division multiplexing an in-band pilot and an out-band pilot for providing a pilot transmission in response thereto in a multiple antenna closed loop transmission; and
    a transmitting means, configured for transmitting said in-band pilot in a first short block in an uplink sub-frame and said out-band pilot in a second short block in said uplink sub-frame;
    wherein said in-band pilot is a beam-specific pilot and said out-band pilot is an antenna-specific pilot, and wherein for beam-specific pilots, pilots are transmitted using the same beam as data transmission, and for antenna-specific pilots, orthogonal pilots are transmitted from multiple antennas.

11. A non-transitory computer readable medium, execution of which by at least one processor configures an apparatus to at least:

multiplex an in-band pilot and an out-band pilot into a pilot transmission signal for transmission in a multiple antenna closed loop transmission, and transmit said pilot transmission signal in an uplink subframe, wherein said in-band pilot is a beam-specific pilot and said out-band pilot is an antenna-specific pilot, and wherein for beam-specific pilots, pilots are transmitted using the same beam as data transmission, and for antenna-specific pilots, orthogonal pilots are transmitted from multiple antennas.

* * * * *